US 6,658,337 B2

(12) United States Patent
Horii et al.

(10) Patent No.: US 6,658,337 B2
(45) Date of Patent: Dec. 2, 2003

(54) VEHICLE HEADLAMP'S OPTICAL AXIS CONTROL SYSTEM

(75) Inventors: Yasutoshi Horii, Nagoya (JP); Yuji Chigusa, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/207,897

(22) Filed: Jul. 31, 2002

(65) Prior Publication Data

US 2003/0045984 A1 Mar. 6, 2003

(30) Foreign Application Priority Data

Aug. 31, 2001 (JP) ........................................ 2001-263049

(51) Int. Cl.[7] .............................................. B60Q 1/00
(52) U.S. Cl. ........................................................ 701/49
(58) Field of Search ....................... 701/36, 49; 362/37, 362/41, 43, 459–460, 473, 475, 476, 487, 507, 523; 315/76–77, 79, 82; 340/468–469, 471

(56) References Cited

U.S. PATENT DOCUMENTS

| | | | | | |
|---|---|---|---|---|---|
| 5,430,450 A | * | 7/1995 | Holmes | ..................... | 342/69 |
| 5,876,113 A | * | 3/1999 | Gotoh | ..................... | 362/466 |
| 5,942,853 A | * | 8/1999 | Piscart | ..................... | 315/82 |
| 6,293,686 B1 | * | 9/2001 | Hayami et al. | ............. | 362/465 |

FOREIGN PATENT DOCUMENTS

| | | |
|---|---|---|
| JP | A-7-32936 | 2/1995 |
| JP | A-7-101291 | 4/1995 |

* cited by examiner

*Primary Examiner*—Thu Nguyen
(74) *Attorney, Agent, or Firm*—Posz & Bethards, PLC

(57) ABSTRACT

A headlamp's optical axis control system for a vehicle includes a infrared light camera for detecting an object on a road in front of the vehicle and a headlamp's optical axis actuator. The headlamp's optical axis is changed according to a vehicle speed and position of the object relative to the vehicle so that the illumination range of the headlamp can cover the object if the object is judged to be out of the illumination range.

5 Claims, 3 Drawing Sheets

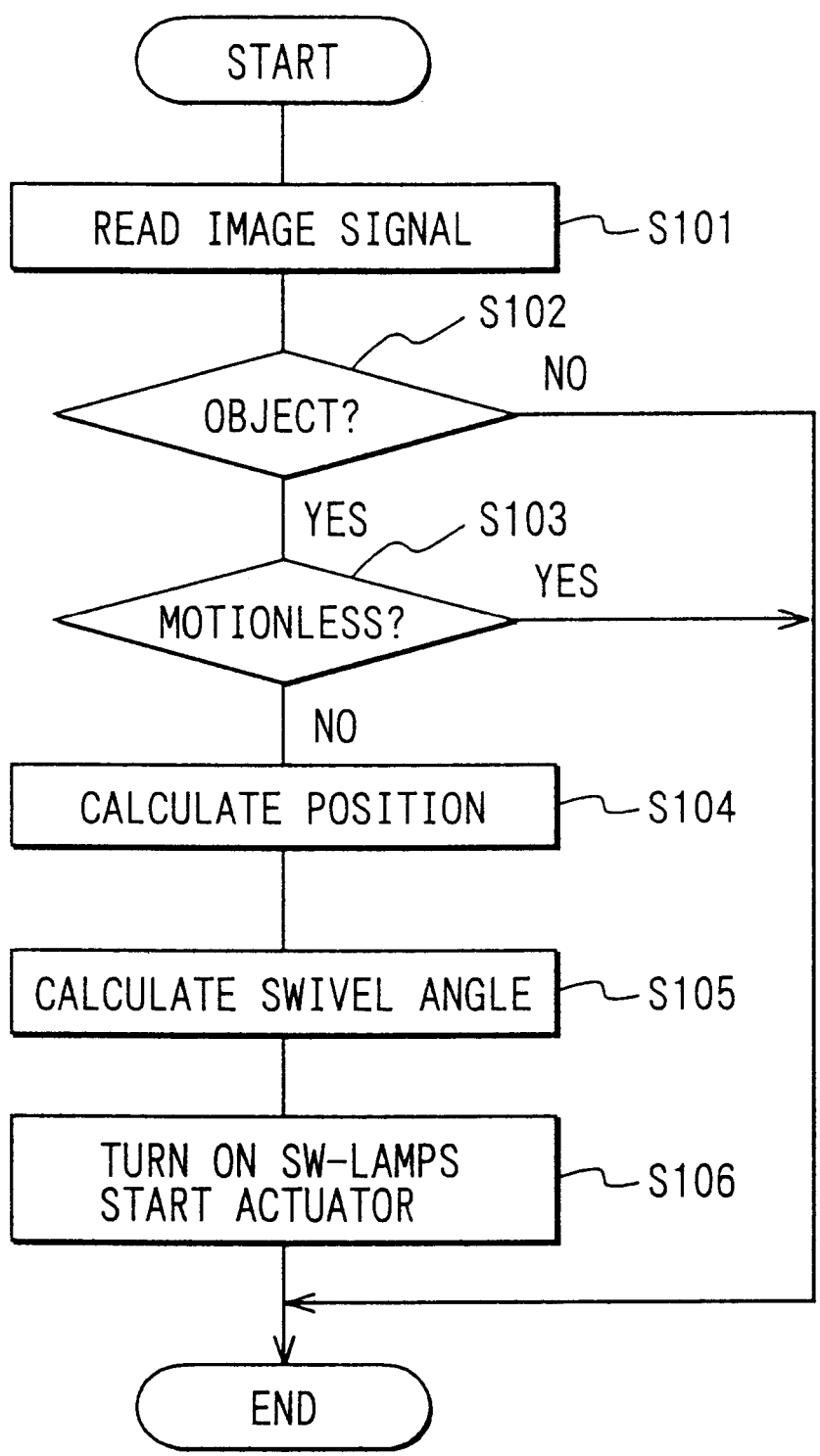

VEHICLE HEADLAMP'S OPTICAL AXIS CONTROL SYSTEM

CROSS REFERENCE TO RELATED APPLICATION

The present application is based on and claims priority from Japanese Patent Application 2001-263049, filed Aug. 31, 2001, the contents of which are incorporated herein by reference.

BACKGROUND OF THE INVENTION

1. Field of the Invention

The present invention relates to a headlamp's optical axis control system for a vehicle.

2. Description of the Related Art

While driving at night, a driver can only recognize an object on a road if such an object is in an illumination range of headlamps. If such an object is out of the illumination range and is not clear to the driver, the driver has to worry about it.

SUMMARY OF THE INVENTION

Therefore, the present invention has been made in view of the above-stated problem.

The invention is to provide a vehicle headlamp's optical axis control system that changes the headlamp's optical axis so that the object can be illuminated even if the object exists out of a normal headlamp illumination range.

According to a feature of the invention, a headlamp's optical axis control system for a vehicle includes vehicle speed sensors, a camera for detecting an object on a road in front of the vehicle, a CPU for judging whether the object is covered by the illumination range or not and an actuator for changing the headlamp's optical axis according to a vehicle speed and position of the object relative to the vehicle so that the illumination range can cover the object if the object is judged to be out of the illumination range. Preferably, the optical axis is not changed if the object is found motionless.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 3 is a flow diagram showing an operation of the vehicle headlamp's optical axis control system.

DETAILED DESCRIPTION OF THE PREFERRED EMBODIMENTS

Figure 1:
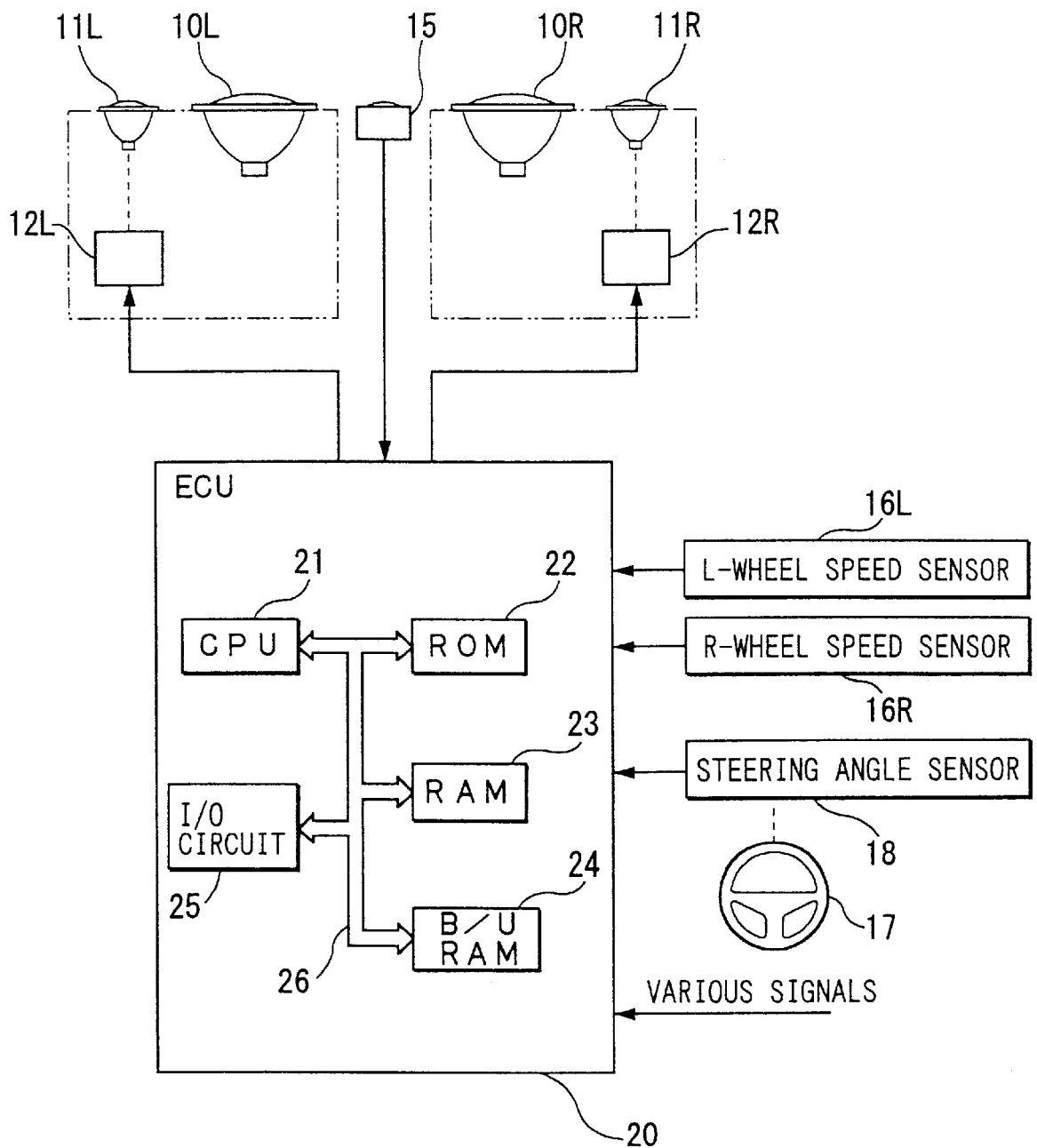
FIG. 1 is a schematic diagram illustrating a vehicle headlamp's optical axis control system according to a preferred embodiment of the invention.

As shown in FIG. 1, a vehicle is equipped with right and left headlamps 10R, 10L, right and left swiveling lamps 11R, 11L, their swiveling actuators 12R, 12L, an infrared light camera 15, right and left wheel speed sensors 16R, 16L, a steering wheel 17, a steering angle sensor 18 and an electronic control unit (ECU) 20.

The infrared light camera 15 is mounted in a front bumper of the vehicle. The infrared light camera 15 has a function to judge whether an object is motionless or not. The steering angle sensor 18 detects steering angle Os of the steering wheel 17 shifted from the neutral position thereof. The ECU 20 includes a central processor unit (CPU) 21, a ROM 22, a RAM 23, a back-up RAM 24, I/O circuit 25, bus lines 26 etc. The ECU 20 connects with the infrared light camera 15, the wheel speed sensors 16R, 16L, and the steering angle sensor 18.

Figure 2:
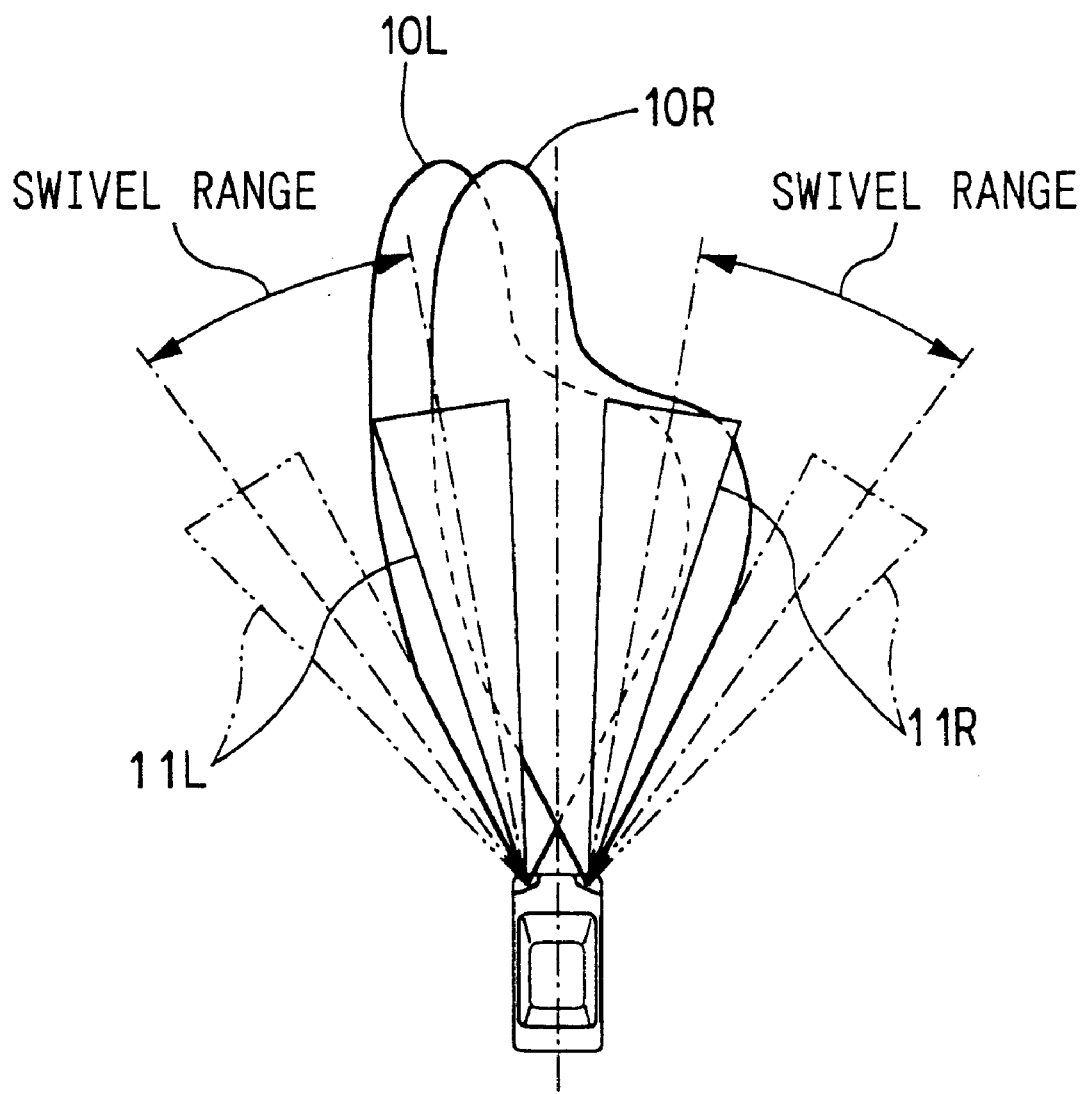
FIG. 2 is an illumination range formed by vehicle headlamps and swiveling lamps that are controlled by the headlamp's optical axis control system according to the preferred embodiment of the invention.

The ECU 20 sends control signals to the swiveling actuators 12R, 12L to control the optical axis of the swiveling lamps 11R, 11L, as shown in FIG. 2. The illumination ranges of the right and left headlamps 10R, 10L (in the low beam state) are fixed, while the swiveling lamps 11R, 11L are controlled to swivel right and left according a control routine shown in FIG. 3. The headlamps 10R, 10L can be modified to be controlled to swivel instead of the swiveling lamps 11R, 11L.

At S101 of the control routine, a signal from the infrared light camera 15 is read. At the next step S102, whether there is an object on a road in front of the vehicle is examined according to the image signal of the infrared light camera 15. If the result of S102 is YES, whether the object is motionless or not is examined at S103. If the result of S103 is YES, the control routine ends.

If, on the other hand, the result of S103 is NO, it is presumed that the object may be a pedestrian, a bicycle rider, or an animal. Then, the following steps S104, S 105 and S106 are executed.

At S104, the distance and direction of the object from the vehicle are calculated from the image signal of the infrared camera 15, and the signals of the wheel speed sensors 16R, 16L. At S105, a target swiveling angle of the optical axes of the right and left swiveling lamps 11R, 11L are calculated. Then, the swiveling lamps 11R, 11L are lit and their actuators 12R, 12L are operated. Therefore, the driver can recognize the object much clearer, and he or she needs not always worry about the object.

The swiveling lamps 11R, 11L can be lit whenever the headlamps 10R, 10L are lit. If the vehicle is equipped with a vehicle-height sensor and an optical axis auto-leveling system, the headlamp's optical axis can be swiveled in three dimensions.

The infrared light camera 15 can be substituted by a radar, such as a laser radar or a millimeter-wave radar.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A headlamp's optical axis control system for a vehicle having a head lamp for illuminating a illumination range in front of the vehicle, said control system comprising:

vehicle speed detecting means;

object detecting means for detecting an object on a road in front of the vehicle;

judging means for judging whether the object is in the illumination range or not;

an optical axis control means for changing the headlamp's optical axis according to a vehicle speed and position of the object relative to the vehicle so that the illumination range can cover the object if said object is judged to be out of the illumination range.

2. The headlamp's optical axis control system as claimed in claim 1, wherein said object detecting means comprises discriminating means for judging whether the object is motionless or not, and said optical axis control means does not change the optical axis if the object is judged to be motionless.

3. The headlamp's optical axis control system as claimed in claim 1, wherein said object detecting means comprises a infrared light camera.

4. The headlamp's optical axis control system as claimed in claim 1, wherein said vehicle speed detecting means comprises a wheel speed sensor.

5. A headlamp's optical axis control system for a vehicle comprising:

a pair of right and left lamps for providing right and left illumination ranges, each of said lamps having a movable optical axis;

a pair of right and left wheel speed sensors for providing speed signals;

an infrared camera for providing an image signal of an object on a road in front of the vehicle;

judging means for judging whether the object is in one of the illumination ranges or not;

an optical axis control means for controlling one of said movable optical axes according to the speed signals and said image signal so that the illumination range of the headlamp having said one of said movable optical axes moves to cover the object if the object is judged to be out of the illumination ranges.

* * * * *